July 18, 1944.          C. A. ATWELL          2,354,097

DIRECT CURRENT MOTOR

Filed Sept. 18, 1942

WITNESSES:
Robert C. Baird
F. P. Lyle

INVENTOR
Clarence A. Atwell.
BY O. B. Buchanan
ATTORNEY

Patented July 18, 1944

2,354,097

UNITED STATES PATENT OFFICE 2,354,097

DIRECT-CURRENT MOTOR

Clarence A. Atwell, Wilkinsburg, Pa., assignor to Westinghouse Electric & Manufacturing Company, East Pittsburgh, Pa., a corporation of Pennsylvania Application September 18, 1942, Serial No. 458,807

8 Claims. (Cl. 171—228)

The present invention relates to direct-current motors and, more particularly, to a means for preventing flashover between the brushes of a direct-current motor when the power is reapplied after a circuit interruption.

Direct-current motors are often subject to flashover between the brushes, across the surface of the commutator, when the power is suddenly reapplied after the circuit has been interrupted. This is an especially troublesome problem in the case of direct-current series traction motors, such as are used for railway and other transportation applications. Such motors are supplied from trolleys or third rails, and circuit interruptions occur at section insulators, cross-overs, third rail breaks, etc., after which the power is immediately and abruptly reapplied to the motor. With some types of control systems the power may also be suddenly applied to the motor in the same manner by operation of the control system. In motors of conventional design, flashovers between the brushes are likely to occur under these circumstances.

One of the chief causes of such flashovers is the transient lag of the commutating field flux behind the armature current. When power is reapplied to the motor after a circuit interruption, the armature current rises rapidly to a maximum and then falls to its steady-state value, which is determined by the load. The armature cross flux due to the armature ampere-turns builds up rapidly with the current, but the commutating field flux builds up more slowly so that there is a lag of this flux behind the current. Thus, during the transient period before the armature current and commutating flux have reached their steady-state values, the amount of commutating flux in the motor is insufficient to provide the necessary compensation of the self-induced electromotive force in the armature coils undergoing commutation, and a sudden "spit" or sparking at the brushes occurs. This sparking often causes arcs between the commutator bars, which are carried across the commutator to the next brush-holder, and a complete flashover between the brushes results.

The principal object of the present invention is to provide a direct-current dynamo-electric machine which is not subject to flashover between the brushes when power is suddenly reapplied after a circuit interruption.

Another object of the invention is to provide a direct-current motor in which the transient lag of the commutating flux behind the armature current, when power is suddenly applied to the motor, is compensated by providing additional commutating flux during the transient period.

A more specific object of the invention is to provide a direct-current motor in which auxiliary commutating field windings are placed on the commutating poles and energizing means are provided to energize these auxiliary windings during the transient period following the sudden application of power to the motor, so as to provide additional commutating flux during this period.

A further object of the invention is to provide a direct-current machine in which the transient lag of the commutating field flux behind the armature current is compensated by the provision of additional commutating flux during the transient period, and in which this compensation is effective to prevent flashover both when the machine is used as a motor and when it is used as a generator for dynamic braking.

The invention will be more fully understood from the following detailed description taken in connection with the accompanying drawing, in which.

Figure 1:
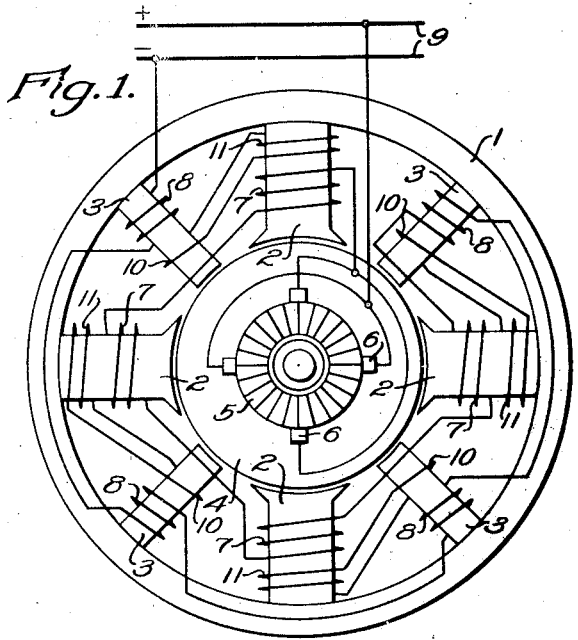
Figure 1 is a diagrammatic view showing the arrangement of the field windings in a direct-current motor embodying the invention.

The invention is illustrated in Fig. 1 as applied to a direct-current series motor having a frame 1, shown diagrammatically, on which are supported a plurality of main pole pieces 2 and a plurality of commutating poles 3. The motor also has a rotor member or armature 4 of any suitable type, on which is mounted a commutator 5 having brushes 6 riding thereon. A four-pole motor has been shown but it will be understood that the invention may be applied to motors having any number of poles.

A main field winding 7 is placed on each of the main pole pieces 2, and all of the windings 7 are connected in series, the connections being made in the usual manner so that the polarities of successive poles are reversed with respect to each other. A commutating field winding 8 is placed on each of the commutating poles 3, and the commutating field windings are all connected in series, the polarity of each commutating pole being the same as that of the preceding main pole in the direction of rotation. In the diagrammatic illustration of the invention, the main field windings 7 and commutating field windings 8 are shown as being connected together in series between the brushes 6 of one polarity and one conductor of a direct-current supply line 9, the brushes of opposite polarity being connected to the other conductor of the supply line 9. It will be understood, of course, that in an actual embodiment of the invention, the main and commutating field windings and the armature would be connected together and to the source of supply by means of a control system of any suitable or usual type.

An auxiliary commutating field winding 10 is placed on each of the commutating poles 3 at the end closest to the armature 4. These windings 10 may consist of relatively few turns, and they are preferably placed as close to the end of the commutating pole as possible. Energizing windings 11 for the auxiliary windings 10 are placed on each of the main pole pieces 2. The energizing windings 11 consist of a few turns of wire of low resistance but preferably have more turns than the windings 10, and they are placed on the pole pieces 2 at the ends adjacent the frame, and preferably as close to the frame as possible. As shown in Fig. 1, the energizing winding 11 on each of the main pole pieces 2 is connected in series with the auxiliary commutating winding 10 on the adjacent commutating pole 3 of the same polarity. The energizing windings 11 are in close inductive relation with the main field windings 7, and when the main field flux is changing, a voltage is induced in the energizing windings 11. When power is suddenly applied to the motor, therefore, the high rate of change of the main field flux in the windings 7 will cause a relatively high transient voltage to be induced in the windings 11, which will cause current to flow through the windings 10 and 11. This current flowing through the auxiliary windings 10 produces additional commutating flux in the same direction as that of the winding 8 so that the total commutating flux during the transient period, while the main field flux is building up, is increased to maintain good commutation and prevent flashover between the brushes.

Figure 2:
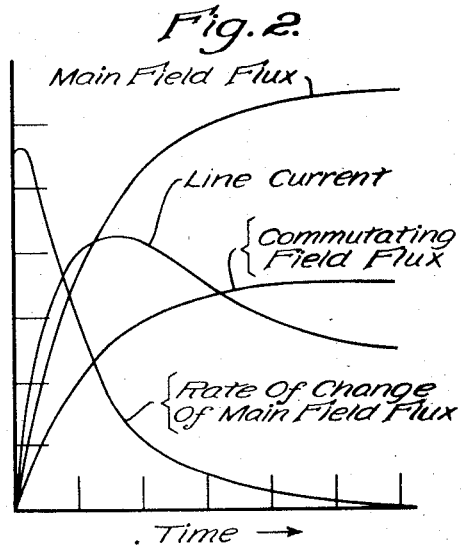
Figs. 2 and 3 are explanatory curves.
Figure 3:
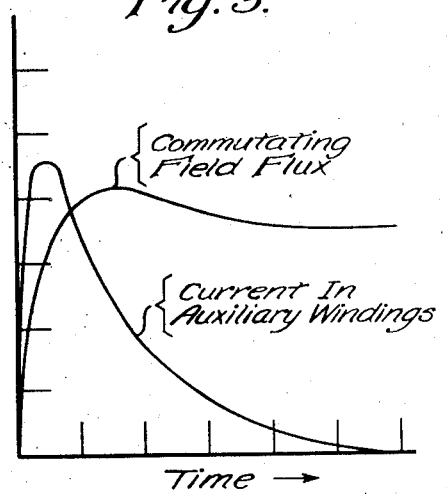

The operation of the present invention will be better understood from a consideration of the curves of Figs. 2 and 3. Fig. 2 shows the characteristics of a direct-current series motor of conventional construction when full line voltage is suddenly applied to it, as after a circuit interruption. It will be seen that the line current rises rapidly to a maximum, and then decreases to its steady-state value. Both the main and commutating field fluxes build up to a maximum more slowly than the line current and due to this lag of the commutating flux behind the armature current, there is insufficient commutating flux throughout the transient period, since the commutating flux is below its final steady-state value throughout the entire transient period, while the line current is above its corresponding final value throughout this period. Thus, during the transient period, there is insufficient commutating flux to provide the necessary compensation of the self-induced electromotive force in the armature coils undergoing commutation, with resultant sparking at the brushes and danger of flashover.

Fig. 3 shows the conditions obtaining when the auxiliary commutating field winding 10 is used, as shown in Fig. 1. With this arrangement, the building up of the main field flux causes voltages to be induced in the windings 11, with consequent circulating currents through the series-connected windings 10 and 11. This current in each of the windings 10 is proportional to the rate of change of the main field flux, as shown by the corresponding curves of Figs. 2 and 3, and falls to zero when the main field flux reaches its steady-state value and becomes substantially constant. During the time when this current is flowing, however, it produces an additional commutating flux, which changes the shape of the commutating flux curve from that of Fig. 2 to that of Fig. 3. The final steady-state value of the commutating flux, produced by the windings 8, is the same in both cases, but it will be seen from Fig. 3 that with the arrangement of the present invention, the total commutating flux builds up very rapidly to a maximum, and then falls off to its normal steady-state value as the current in the windings 10 decays. Thus, an adequate commutating field is provided throughout the transient period, and the danger of flashover between the brushes as a result of sparking is avoided.

The energizing windings 11 are preferably placed on the main pole pieces 2 adjacent the frame 1, and they should be disposed as close to the frame 1 as possible. By placing the windings 11 in this position, they link a relatively large part of the leakage flux, and thus higher voltages are induced in them than would be the case if they were placed on some other part of the main pole pieces. The auxiliary commutating windings 10 are placed on the opposite ends of the commutating poles 3, to be as close as possible to the armature so that as much as possible of the flux produced by these windings will link the armature conductors and be available for improving the commutation. Voltages will, of course, be induced in the windings 10 by the changing flux of the commutating field windings 8, but these voltages are relatively much smaller than the voltages induced in the windings 11, since the windings 10 have fewer turns than the windings 11.

Direct-current series motors, such as have been discussed above, are often used in applications where dynamic braking is desired, that is, the motor is driven as a generator in order to obtain a braking effect on the load to which it is connected. When a motor is operated as a generator for dynamic braking, the polarity of either the commutating poles or the main poles must be reversed, and the present invention may be applied to motors which are to be used for dynamic braking when control systems are utilized which reverse the polarity of the main poles when the motor is to be used for braking.

Figure 4:
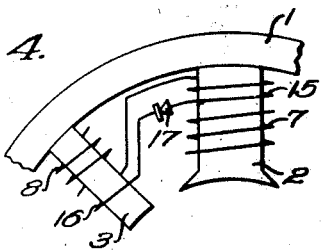
Fig. 4 is a fragmentary diagrammatic view of a portion of a direct-current motor showing a modification of the invention.

Fig. 4 shows diagrammatically the necessary modification of the arrangement shown in Fig. 1 to adapt the invention for use in this way. Fig. 4 shows diagrammatically a portion of a motor similar to that shown in Fig. 1, the connections of the main field winding 7 and commutating field winding 8 being omitted for the sake of clearness. In this modification of the invention, an energizing winding 15 is placed on the main pole piece 2 in the same manner as the winding 11 of Fig. 1, and the winding 15 is connected in series with an auxiliary commutating field winding 16 which is placed on the adjacent commutating pole 3 in the same manner as the winding 10 of Fig. 1. In this modification of the invention, however, a rectifier unit 17 is interposed in the connection between the windings 15 and 16 to permit current flow in one direction but not in the other. The rectifier unit 17 may be of the contact type, such as a copper oxide rectifier, or it may be any other suitable type of electric valve device which permits current to flow in one direction but not in the other.

When the machine of Fig. 4 is running as a motor the operation is the same as that described above in connection with Fig. 1 to provide additional commutating flux when power is suddenly applied to the machine, to prevent sparking at the brushes and flashover. When the machine is to be run as a generator for dynamic braking, the polarity of the main poles is reversed, and the direction of the voltage induced in the winding 15 is, therefore, also reversed. This reversed voltage in the winding 15 would cause a current flow through the winding 16 which would produce a flux opposing the flux of the main commutating winding 8, so that the resultant commutating flux of the machine would be reduced, thus aggravating the tendency to spark at the brushes. The use of the rectifier 17, however, prevents current flow in this direction, so that when the machine is operated as a generator with the polarity of the main poles reversed, no current will flow through the winding 16, and the commutating field of the machine is that produced by the winding 8 only. Thus, in this modification of the invention, the auxiliary winding is effective in preventing flashover upon reapplication of power after a circuit interruption when the machine is operating as a motor, but it has no effect on the operation of the machine when it is operating as a generator for dynamic braking.

In some instances, where a motor is to be used both for propulsion and for dynamic braking, it is desirable to provide compensation for the transient lag of the commutating field when the machine is operating as a generator as well as when it is running as a motor, since a sudden application of load on the machine as a generator may cause sparking at the brushes in the same manner as described above because of the lag of the commutating flux behind the armature current. In such cases, the embodiment of the invention shown in Fig. 5 may be used to provide compensation for the transient lag of the commutating flux both for motoring and for generating.

Figure 5:
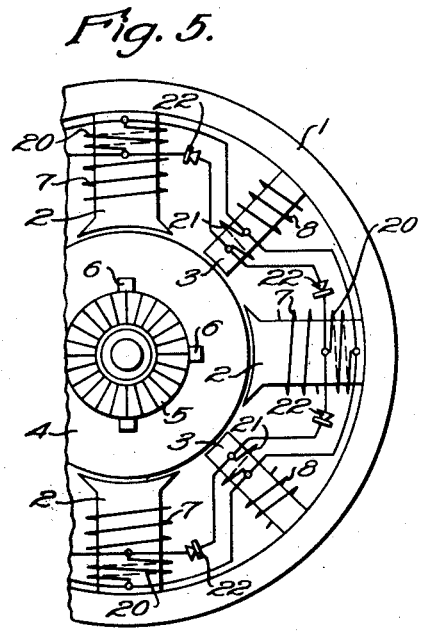
Fig. 5 is a diagrammatic view of a portion of a direct-current machine showing a further embodiment of the invention.

In this embodiment of the invention, the main field and commutating windings 7 and 8 are arranged in the same manner as shown in Fig. 1, the connections of these windings being omitted in Fig. 5 to avoid complication of the drawing. An energizing winding 20, which may be similar to the windings 11 and 15, is placed on each of the main pole pieces 2 adjacent the frame, and an auxiliary commutating winding 21, which may be similar to the windings 10 and 16, is placed on each of the commutating poles 3 closely adjacent the armature. Each auxiliary commutating winding 21 is connected to the energizing windings 20 on both adjacent main poles, so that current may flow to the winding 21 from either of these windings. A rectifier unit 22, or other suitable electric valve device, is connected between each of the windings 21 and each of the adjacent energizing windings 20, the rectifiers being arranged as shown so that they permit current to flow through the winding 21 in one direction only.

In operation, when the machine is running as a motor, if the circuit is interrupted and power then abruptly reapplied, the rapid change in the flux of the main field windings 7 causes voltages to be induced in the energizing windings 20 in the manner described above. The induced voltages in the windings 20 cause currents to flow from each winding 20 through the winding 21 on the adjacent commutating pole of the same polarity, the rectifiers 22 preventing flow of current from the windings 20 to the windings 21 on adjacent commutating poles of opposite polarity. Thus, the operation in preventing flashover between the brushes is the same as that described above in connection with Fig. 1.

If the machine is to be operated as a generator for dynamic braking, the polarity of the main poles is reversed, leaving the polarity of the commutating poles the same as before. When load is suddenly applied to the machine as a generator, the main field will build up rapidly, although in the reverse direction, and cause voltages to be induced in the energizing windings 20 in the same manner as when the machine was running as a motor but in the opposite direction. Since these voltages are reversed in direction from the previously described voltages, they will tend to cause current flow from the windings 20 in the reverse direction. The rectifiers 22, however, will prevent this current from flowing through the windings 21 in the reverse direction, and will permit current to flow through each winding 21 from the winding 20 on the adjacent main pole which is now of the same polarity but which was of opposite polarity when the machine was running as a motor. In other words, when the machine is running as a motor the winding 20 on each main pole piece 2 will supply current to the winding 21 on one adjacent commutating pole 3, and when the machine is running as a generator, the same winding 20 will supply current to the winding 21 on the adjacent commutating pole on the opposite side, since the polarities of the commutating poles are unchanged and the polarity of the main pole is reversed. Thus, the desired compensation for the transient lag of the interpole flux is provided when the machine is operating either as a motor or as a generator and danger of flashover as a result of sparking at the brushes is avoided.

It should now be apparent that a very effective means has been provided for preventing flashover of direct-current motors resulting from sparking at the brushes caused by the transient lag of the commutating field flux when power is reapplied after a circuit interruption. It will be understood, of course, that although certain specific embodiments of the invention have been shown and described for the purpose of illustration, it is not limited to the particular arrangement described, but is capable of numerous modifications and may be adapted to various other types of machines. The invention is, therefore, not restricted to the particular arrangement shown and described, but in its broadest aspects it includes all equivalent embodiments and modifications which come within the scope of the appended claims.

I claim as my invention:

1. A direct-current dynamo-electric machine having a stator member and a rotor member, a plurality of main pole pieces on the stator member, main field windings on said main pole pieces to provide a main field flux for the machines, a plurality of commutating poles on the stator member, commutating field windings on the commutating poles to provide a commutating field flux, auxiliary commutating field windings to provide additional commutating field flux, energizing means for said auxiliary commutating field windings, said energizing means comprising windings on the main pole pieces in inductive relation to the main field windings, and means permitting current to flow from the energizing windings to the auxiliary commutating field windings in one direction only.

2. A direct-current dynamo-electric machine, having a stator member and a rotor member, a plurality of main pole pieces on the stator member, main field windings on said main pole pieces to provide a main field flux for the machines, a plurality of commutating poles on the stator member, commutating field windings on the commutating poles to provide a commutating field flux, an auxiliary commutating field winding on each commutating pole, energizing means for said auxiliary commutating field windings, said energizing means comprising a winding on each main pole piece in inductive relation to the main field winding thereon, and means connecting each energizing winding to the auxiliary commutating field winding on an adjacent commutating pole, said connecting means including valve means to permit current flow in one direction only.

3. A direct-current dynamo-electric machine having a stator member and a rotor member, a plurality of main pole pieces on the stator member, main field windings on said main pole pieces to provide a main field flux for the machines, a plurality of commutating poles on the stator member, commutating field windings on the commutating poles to provide a commutating field flux, auxiliary commutating field windings to provide additional commutating field flux, energizing means for said auxiliary commutating field windings, said energizing means comprising windings on the main pole pieces in inductive relation to the main field windings, and means connecting said energizing windings to said auxiliary commutating field windings, said connecting means including valve means to permit current to flow through the auxiliary windings in one direction only.

4. A direct-current dynamo-electric machine having a stator member and a rotor member, a plurality of main pole pieces on the stator member, main field windings on said main pole pieces to provide a main field flux for the machines, a plurality of commutating poles on the stator member, commutating field windings on the commutating poles to provide a commutating field flux, an auxiliary commutating field winding on each commutating pole, energizing means for said auxiliary commutating field windings, said energizing means comprising a winding on each main pole piece in inductive relation to the main field winding thereon, means connecting each auxiliary commutating field winding to the energizing windings on adjacent main pole pieces, and valve means in said connecting means to permit current flow through the auxiliary windings in one direction only.

5. A direct-current dynamo-electric machine having a stator member and a rotor member, a plurality of main pole pieces on the stator member, main field windings on said main pole pieces to provide a main field flux, a plurality of commutating poles on the stator member, commutating field windings on the commutating poles to provide a commutating field flux, an auxiliary commutating field winding on each commutating pole, energizing windings on said main pole pieces in inductive relation to said main field windings, said energizing windings being connected to said auxiliary commutating field windings, and means connected to each auxiliary commutating field winding to permit current to flow in one direction only.

6. A direct-current dynamo-electric machine having a stator member and a rotor member, a plurality of main pole pieces on the stator member, main field windings on said main pole pieces to provide a main field flux, a plurality of commutating poles on the stator member, commutating field windings on the commutating poles to provide a commutating field flux, an auxiliary commutating field winding on each commutating pole, energizing windings on said main pole pieces in inductive relation to said main field windings, said energizing windings being connected to said auxiliary commutating field windings, and a rectifier device connected in series with each auxiliary commutating field winding to permit current to flow in the winding in one direction only.

7. A direct-current dynamo-electric machine having a stator member and a rotor member, a plurality of main pole pieces on the stator member, main field windings on the main pole pieces to provide a main field flux, a plurality of commutating poles on the stator member in the spaces between the main pole pieces, commutating field windings on the commutating poles to provide a commutating field flux, an auxiliary commutating field winding on each commutating pole, an energizing winding on each main pole piece in inductive relation to the main field winding thereon, means for connecting each of said energizing windings to the auxiliary commutating field windings on the commutating poles on both sides thereof, and means for permitting current to flow through the auxiliary commutating field windings in one direction only.

8. A direct-current dynamo-electric machine having a stator member and a rotor member, a plurality of main pole pieces on the stator member, main field windings on the main pole pieces to provide a main field flux, a plurality of commutating poles on the stator member in the spaces between the main pole pieces, commutating field windings on the commutating poles to provide a commutating field flux, an auxiliary commutating field winding on each commutating pole, an energizing winding on each main pole piece in inductive relation to the main field winding thereon, means for connecting each of said energizing windings in series with the adjacent auxiliary commutating field winding on one side thereof, means for connecting each of said energizing windings in series with the adjacent auxiliary commutating field winding on the other side thereof, and rectifier means interposed in all of said connecting means to permit current to flow in each auxiliary commutating winding in one direction only.

CLARENCE A. ATWELL.